(12) United States Patent
Mayen et al.

(10) Patent No.: US 7,914,025 B2
(45) Date of Patent: Mar. 29, 2011

(54) MODULAR SUSPENSION SYSTEM

(75) Inventors: Julio Werner Mayen, Jamul, CA (US); Terry Curtis Buch, Jamul, CA (US)

(73) Assignee: JME Enterprises, Inc., Jamul, CA (US)

(*) Notice: Subject to any disclaimer, the term of this patent is extended or adjusted under 35 U.S.C. 154(b) by 245 days.

(21) Appl. No.: 12/049,111

(22) Filed: Mar. 14, 2008

(65) Prior Publication Data
US 2009/0230650 A1   Sep. 17, 2009

(51) Int. Cl.
*B60G 7/02* (2006.01)
(52) U.S. Cl. ............................................. 280/124.109
(58) Field of Classification Search .......... 280/124.128, 280/124.116, 124.132, 124.134, 124.135, 280/124.136, 124.137, 124.109
See application file for complete search history.

(56) References Cited

U.S. PATENT DOCUMENTS

| | | | |
|---|---|---|---|
| 3,852,872 A * | 12/1974 | Afanador et al. ............... 29/447 |
| 4,474,363 A | 10/1984 | Numazawa et al. |
| 4,534,575 A * | 8/1985 | Grove et al. ........... 280/124.136 |
| 4,836,577 A | 6/1989 | Abe et al. |
| 5,016,909 A | 5/1991 | Lin |
| 5,324,056 A | 6/1994 | Orton |
| 5,362,090 A * | 11/1994 | Takeuchi ............... 280/124.152 |
| 6,017,044 A | 1/2000 | Kawagoe |
| 6,042,131 A | 3/2000 | Bailey |
| 6,116,626 A * | 9/2000 | Cherry et al. .......... 280/124.135 |
| 6,244,607 B1 | 6/2001 | Nishino |
| 6,390,485 B1 | 5/2002 | Cadden |
| 6,543,797 B2 | 4/2003 | Van Schmus et al. |
| 6,733,021 B1 * | 5/2004 | Ziech et al. ............ 280/124.109 |
| 6,763,905 B2 * | 7/2004 | Cocco et al. ................... 180/210 |
| 6,905,129 B2 * | 6/2005 | Runte et al. ........... 280/124.134 |
| 7,481,441 B2 * | 1/2009 | Kirkham .................. 280/93.512 |
| 7,510,197 B2 * | 3/2009 | Gottschalk ................... 280/86.5 |

* cited by examiner

*Primary Examiner* — Faye M. Fleming
(74) *Attorney, Agent, or Firm* — Lisel M. Ferguson; Procopio, Cory, Hargreaves & Savitch, LLP

(57) ABSTRACT

A modular suspension system for automobiles and trucks. The present invention relates to a suspension system which is both modular in design and specifically manufactured for high performance wheeled vehicles. This system has multiple modular parts which enable the system to function in various makes and models of vehicles. The modular aspects of this system also enable the cradle to be removable so that the engine and transmission of the vehicle can be easily reached. The modular aspects also allow this system to be set-up with a traditional shock configuration or with a rocker set-up shock system.

18 Claims, 16 Drawing Sheets

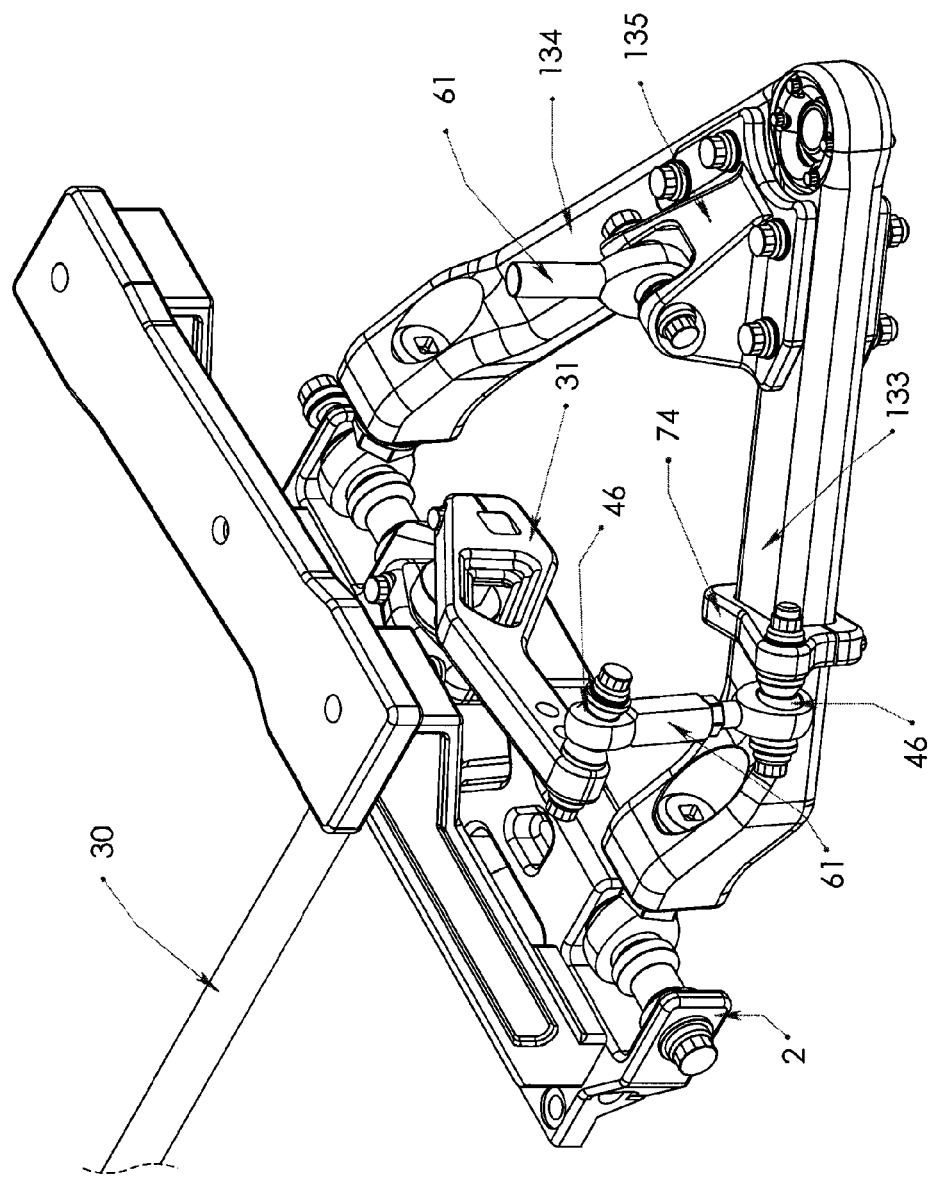

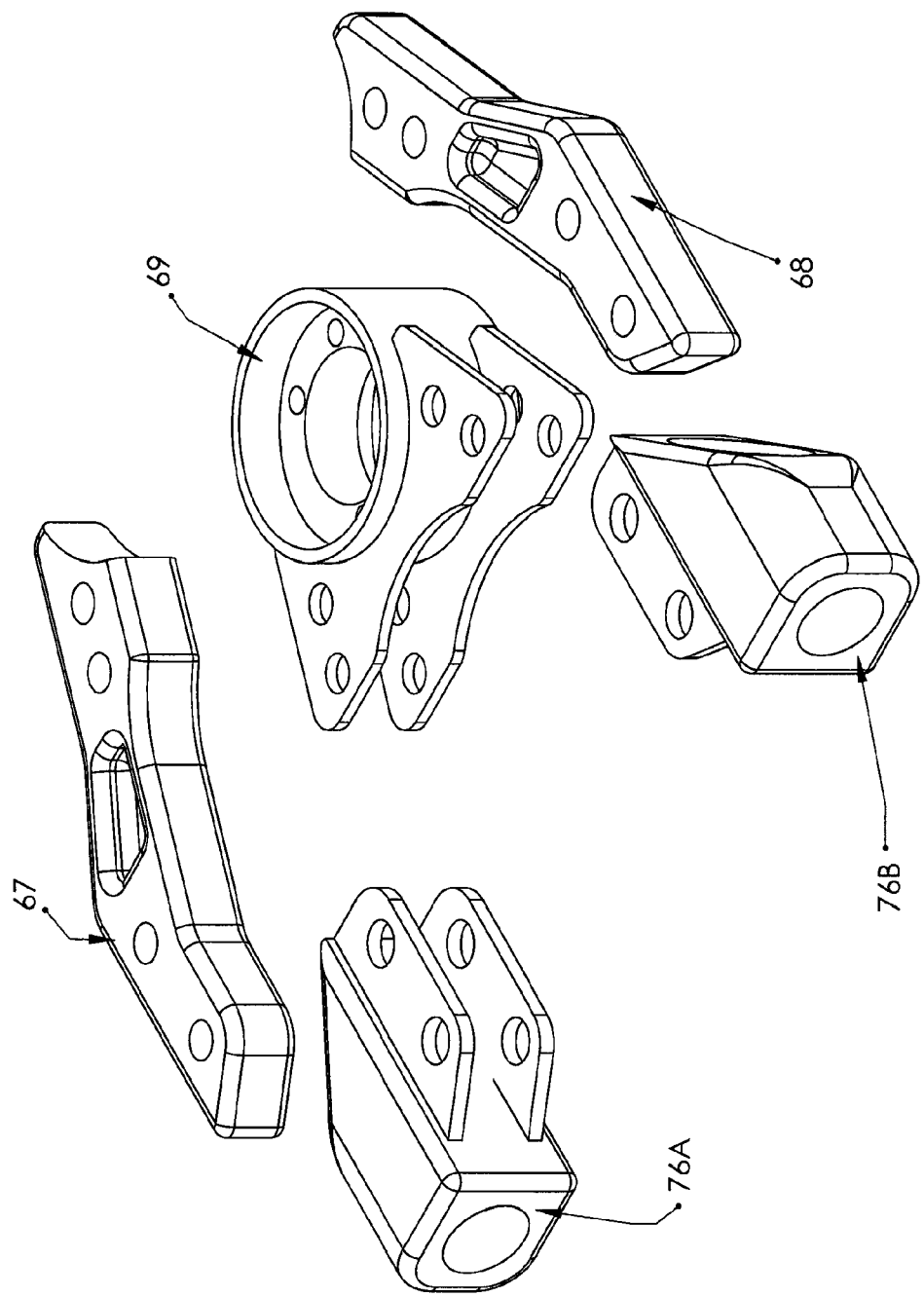

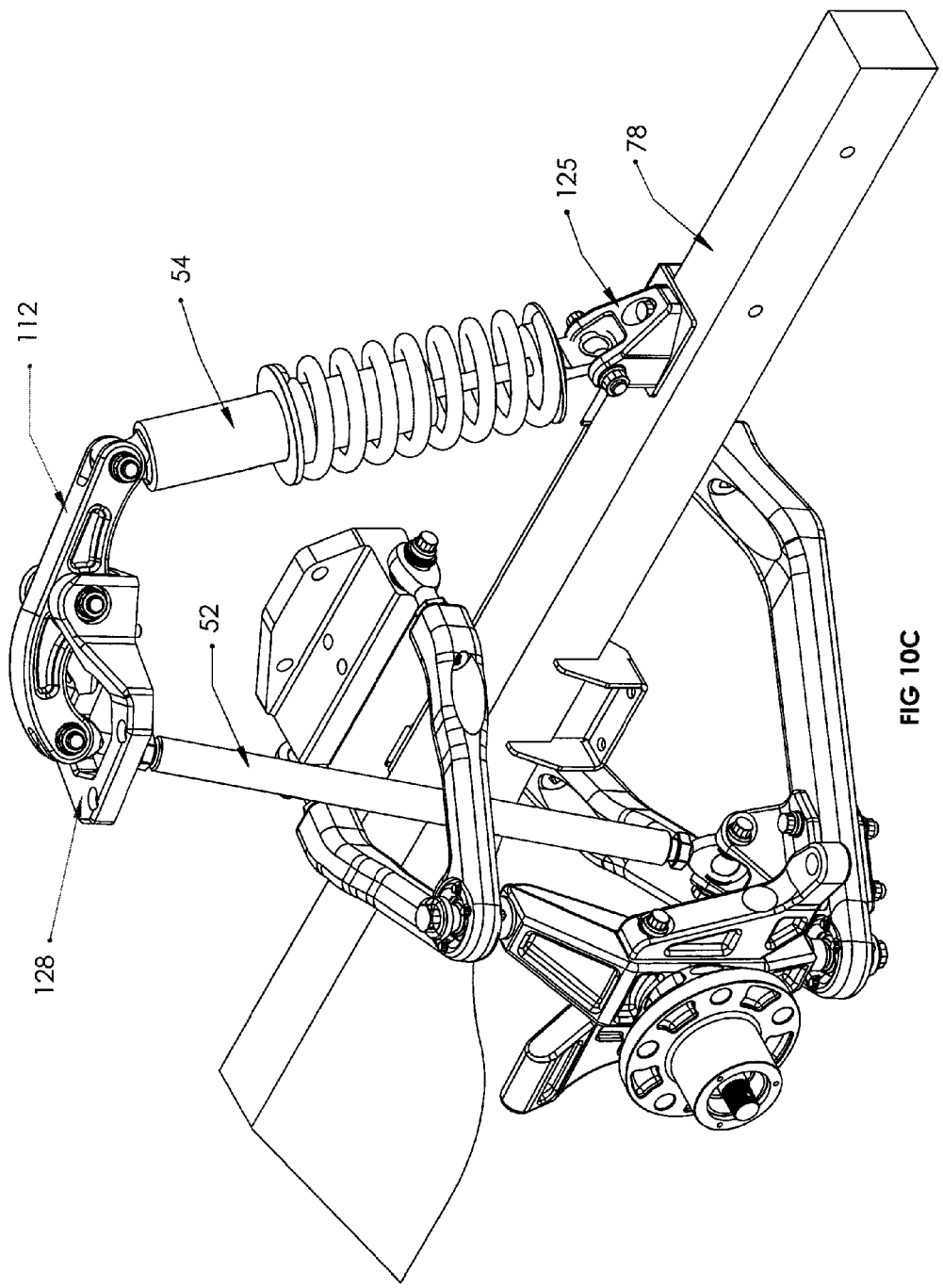

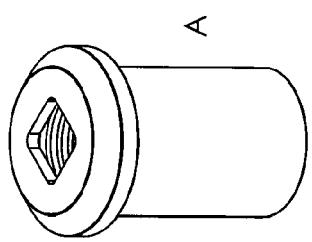
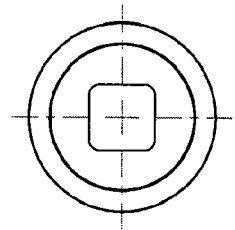 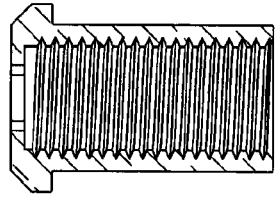 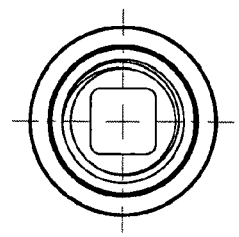
FIG. 11

MODULAR SUSPENSION SYSTEM

FIELD OF THE INVENTION

The present invention relates, in general, to a modular suspension system for automobiles and trucks. More particularly, the present invention relates to a system which is both modular in design and specifically manufactured for high performance wheeled vehicles.

BACKGROUND OF THE INVENTION

Suspension systems have been in existence since the automobile was invented. These systems enable automobiles to absorb shock stay in line when driving and essentially hold vehicle to the road. There are many different types of suspension systems one is a Macphereson strut suspension which is the standard in most passenger vehicles currently due to the cost effectiveness and ease of assembly while on the production line for the vehicle manufacturer.

The are many other types of suspensions systems include but are not limited to, traditional double wish bone, multi link, trailing arm, linked and dependent systems. While versatile, these systems are not of modular design and generally do not have much adjustability limiting the range for basic alignment specifications especially for performance or racing applications. In most cases they are a compromise for the given application in an effort to keep production cost down for the vehicle manufacturer. None are of a modular design that would allow a wider range of application, reduction in costs and more adjustability.

There is, thus, a need for a suspension system which is modular, has geometry optimized for unsurpassed handling and performance, which has zero bump steer and has a wide range of adjustability and applications and can be manufactured either with an upright traditional shock design or rocker set-up (cantilever pushrod design).

SUMMARY OF THE INVENTION

This invention involves a method for manufacturing and using a modular suspension system ("system") which is high performance, reliable, dependable, effective, low maintenance and structurally sound. The object of the present invention is to provide a suspension system capable of being easily disassembled to access a automobiles engine parts and to allow parts of the system to be easily interchangeable and eliminate defects and drawbacks encountered in the prior art. This suspension also maintains a desired camber angle during various driving maneuvers and roadway conditions. Many pieces of the instant suspension system are bolted together in contrast to conventional suspension systems where these same pieces are welded, cast or otherwise not modular. This modular design has many benefits including the ability to easily access a car's engine, oil pan or other parts without the need to remove the entire suspension or a large portion thereof. The modular construction allows installation of interchangeable parts enabling this suspension to function with different makes and models of vehicles, in differing driving conditions or allowing increased performance for differing forms of driving such as racing or off-road driving.

This suspension system is attached to the body of the vehicle and in its most basic embodiment is comprised of a right and a left side connected by a front cross member, a rear cross member and a sway bar. Each the right and left side has at a minimum upper control arms, modular lower control arms, a hub, steering arm, brake mount, cradle brace, cradle mount, rear cradle support, lower shock mount, upper shock mount, modular motor mount, axle, rack bushing, spindle, shock, rocker mount, axle shaft and frame mount locator thus making the entire suspension system have two of each of these parts. In alternate embodiments the system can also have push rods, a rocker, lay down shock mount, and rocker mount. This suspension system has many benefits over standard suspensions. Some of the parts which are novel are the control arms, the motor mounts, the spindles, the sway bar, cross members, the upper shock mount and the rocker shock design and configuration. The suspension is a double wishbone design which replaces the inferior strut suspension. All of the geometry of this suspension system is optimized for unsurpassed handling and performance. It has zero bump steer and is tested and proven on the racetrack. The spindles incorporate a two inch drop in ride height to maintain proper suspension geometry. The upper control arm is off set back of lower control arm which creates static positive caster. This suspension can be built in conventional shock configuration (upright shock) or rocker set-up (cantilever push-rod design). There are three positions of the adjustable anti-roll bar which provides for wide range of adjustability. The spherical bearings which add many additional benefits to the system which will be explained in detail below and are self-lubricating thus requiring no maintenance.

The motor mount of this suspension uses a spherical bearing or ball joint which allows the engine and transmission assembly to be articulated in the proper driveline angle for the particular vehicle. The spherical bearings of the motor mount also allow the motor to be articulated for easier transmission removal and installation. The center section(s) of the cross member or k-member is removable so that the user can easily access the oil pain and remove it if necessary.

One of the parts of this instant invention which is novel are the modular control arms. In standard suspensions control arms are stamped or cast all as one piece or welded together to be one piece. Here, there are upper and lower control arm(s). The control arms are modular in design so they can be used on either side of the car while reducing the cost of material. The upper and lower control arms of the system are symmetrical thus allowing them to be used on either the right or the left side of the system. The upper and lower control arms can also be inverted which allows the wheel base of the vehicle to be extended which is beneficial for race applications. It allows the weight of the engine/transmission assembly to be moved more toward the back of the car thus increasing more uniform weight distribution fore and aft.

The control arms are attached with specially designed adjusters which are machined with ⅜ inch or ½ inch square drive for the upper control arm and the lower arm so that the common ⅜ inch or ½ inch ratchet wrench extensions can be used which make camber and caster alignment adjustments easy. In a preferred embodiment the upper control arm is shifted back of the center line of the lower control arm by 3 degrees. In alternative embodiments this shift can be between 1 and 7 degrees. This shift is made by adjusting the upper and lower control arm adjusters in a way that the lower end of the spindle is moved forward or back and the top of the spindle is moved forward or back to provide more or less caster. This helps to keep the suspension geometry more consistent throughout the suspension travel. The control arms of the instant invention provide superior corrected ball joint angles. These arms can be machined in aluminum to reduce the weight of the system. As such the control arms of this system are versatile and can be used independently from the system as a whole.

This suspension system has a modular front cradle also referred to as a k-member. This design is different than that of other suspensions as it is modular in design and construction having the ideal geometry for vehicle handling and is also a cost effective construction. The geometry of this suspension reduces the over steer (vehicle back end swing) and under steer (vehicle front end push) effect which becomes an issue with other suspensions. It allows the vehicle's tires to maintain a more consistent contact patch of the tire with the road. This means that more of the surface area on the tires has contact with the road throughout the range of the suspension's travel. This more uniform contact between the tire and the road increases the traction of the vehicle. The increased traction improves the turning of the vehicle reducing any over steer or push which may occur with less traction.

This system also has spindles which are modular and symmetrical in design. This design allows for the brake mounts and steering arms to be changed for many different driving applications or vehicle types. The spindles are designed with relocated axle shafts which lower the ride height of the vehicle while maintaining the optimum geometry of the suspension system. Lowering the ride height creates a lower center of gravity without compromising the performance of the suspension system. The spindles have axle shafts with left hand threads so when the hub nut is tightened it also tightens the axle shaft. The axle shaft in the spindle is modular in design allowing for the spindle to be used with other axle/hub configurations. The spindles of the instant invention can also be used independently as a part in several other original suspension systems. As such the spindles of this system are versatile and can be used independently from the system as a whole.

The anti-roll/sway bar of the system has three adjustment positions to allow built in adjustability to stiffen or soften the ride as needed for varying track or street conditions. Furthermore the mount of these anti-roll/sway bars to the lower control arm is allowed to move in and out on arm which allows for more adjustability (further in=softer and further out=stiffer).

The upper shock mount of this system is also modular in design. In the prior art the shock mounts are fixed. The modular design of the upper shock mount of this system allows for the use of different shocks and further allows for ride height adjustments. This system can accommodate shocks ranging between 10 and 20 inches in length. The design of the shock mount also allows for the system to become a rocker/cantilever/bellcrank set-up so shocks can be mounted inside the engine compartment for ease of adjustment and to reduce unsprung weight.

The Rack & Pinion steering rack mounting points are designed to allow for the steering rack to move fore and aft for fine tune adjustment of bump and ackerman.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings:

FIG. 7 is the anti-roll/sway bar and one embodiment of the lower control arm of the modular suspension system;

FIG. 9B is an exploded view of the upper control arms of FIG. 9A;

FIG. 10C is an embodiment of the shock set-up of the modular suspension system commonly referred to as a rocker set-up where the rocker mount and rocker arm sits on top of a vehicles existing shock/strut tower;

FIG. 11A is a isometric view of the specially designed adjuster of the modular suspension system shown in FIG. 1;

FIG. 11B is a top view of the specially designed adjuster of the modular suspension system shown in FIG. 1;

FIG. 11C is a side cross-sectional view of the specially designed adjuster of the modular suspension system shown in FIG. 1;

FIG. 11D is a bottom view of the specially designed adjuster of the modular suspension system;

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Figure 1:
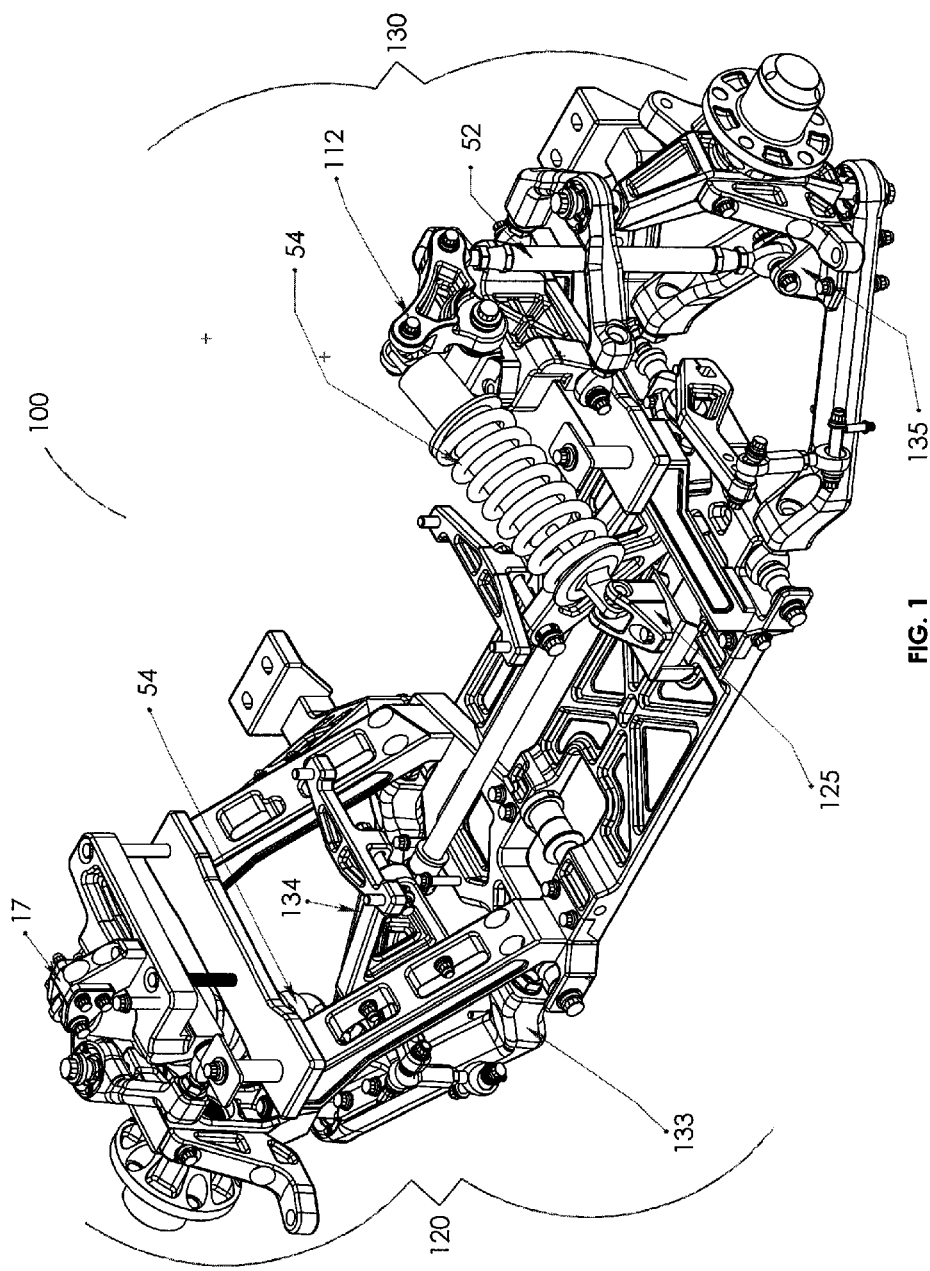
FIG. 1 is a perspective view of an embodiment of a modular suspension system with a traditional shock configuration on the left side and a rocker set-up on the other.

With reference to FIG. 1 a modular suspension system ("system") 100 is shown and displayed. This invention involves a suspension system 100 which is modular. The suspension has a right 130 and a left side 120. Each side is essentially a mirror of the other in that the parts are assembled in the same configuration on each side. The benefit to modular construction is that the components of the sides can be configured or assembled differently from one system to the next depending on the vehicle it will be installed in, or the type of driving the vehicle will be used for. FIG. 1 shows how a traditional shock configuration or a rocker assembly (also known as a push rod) could be used with this system. In this figure the traditional shock assembly is shown on the left side 120 while a rocker assembly is shown on the right 130. This is a hypothetical setup because a finished system would either have a traditional shock configuration on both sides or a rocker assembly on both sides.

In a traditional shock configuration shown on the left side 120, the shock 54 is connected to the upper shock mount 17 at its top end and the lower shock mount 135 which is attached to the lower control arms 133, 134 at its bottom. In the rocker assembly shown on the right side 130 the shock 54 is attached to the frame rocker shock mount 125 on one end and the rocker 112 at its other end. The push rod 52 of this assembly is attached at one end to the rocker 112 and at its other end to the lower shock mount 135. The rocker assembly allows for increased adjustment capability in the ride height and increased access for adjustments of the push rod 52 and shock assembly. This assembly allows the user to change the parameters on the push rod 52, such as the length of the push rod 52 which is used, this helps to reduce unsprung weight. Reduction in unsprung weight is beneficial in that it allows the system 100 to more easily follow the contour or the road surface and increases the contact patch of the tires. The upper shock mount 17 of the system 100 can be manufactured in different dimensions to allow various upper shock mount 17 attachment points enabling ride height adjustments.

Figure 2:
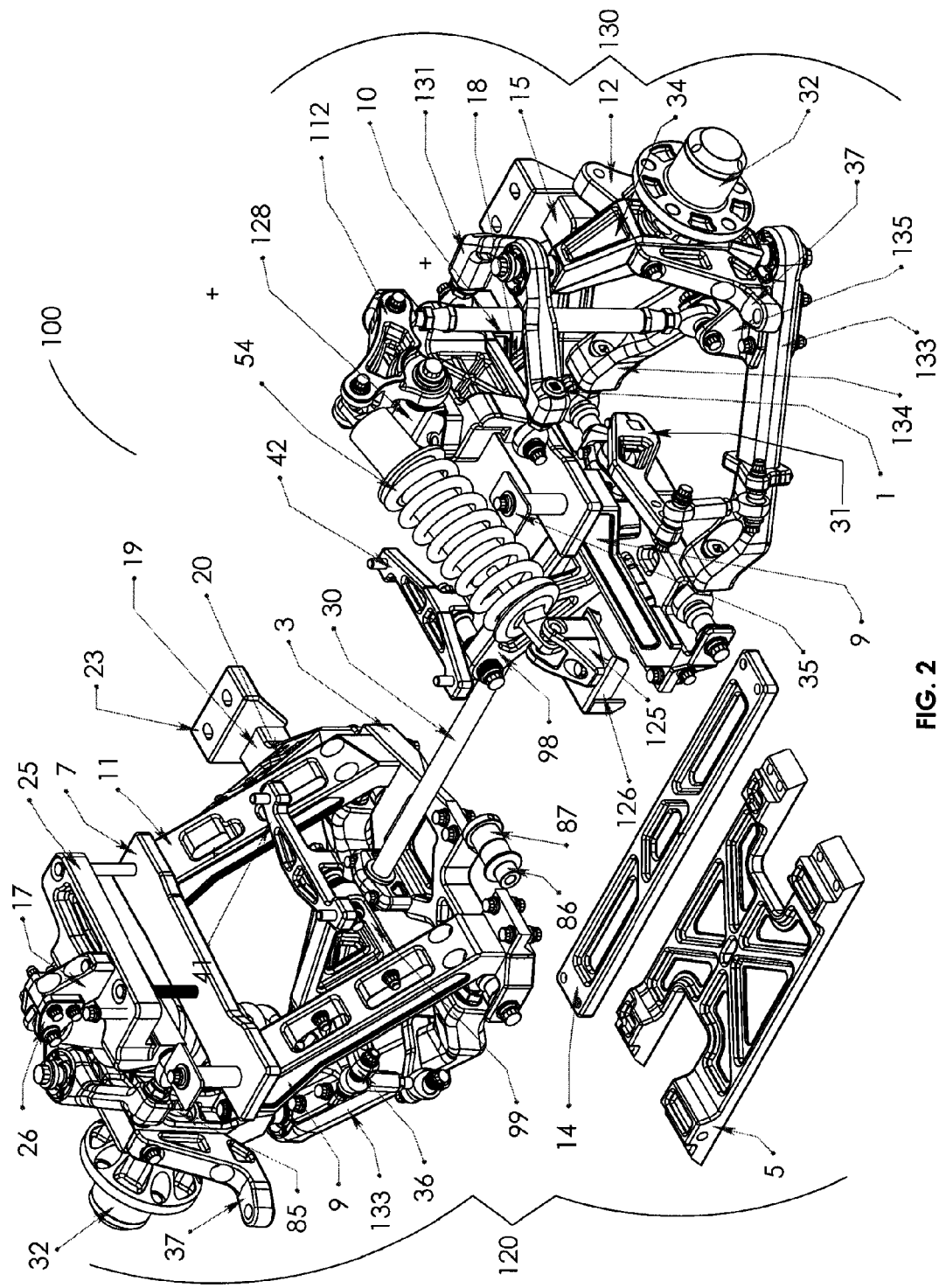
FIG. 2 is a exploded view of an embodiment of a modular suspension system shown in FIG. 1.

Referring to FIG. 2 which is an exploded view of the embodiment of the system show in FIG. 1, the system 100 is composed of a front cross member 5, a rear cross member 14, and sway bar 30, which all connect the right 130 and the left 120 sides of the suspension. In its most basic embodiment the major parts comprising each the right 130 and left 120 side of the system 100 are the following: a hub 32, a steering arm 37, brake mount 12, upright 34, cradle brace 18, rear cradle support 15, lower shock mount 135, rack bushing 86 and 87, motor mount 42, two cradle uprights 9 and 11, upper arms 131, lower arms 133 and 134, shock 54, frame mount locator 7, motor mount frame 99, and axle shaft 85. In alternate embodiments the system 100 may also include a rocker 112, rocker mount 128, and a frame rocker shock mount 125. It should be noted that many of these parts are modular and they will be broken out and explained in more detail in FIGS. 3 through 11 below. The configuration of the components on the left 120 and right 130 side of the system 100 can be modified and changed depending on the vehicle, driving terrain or desired driving use.

Figure 3:
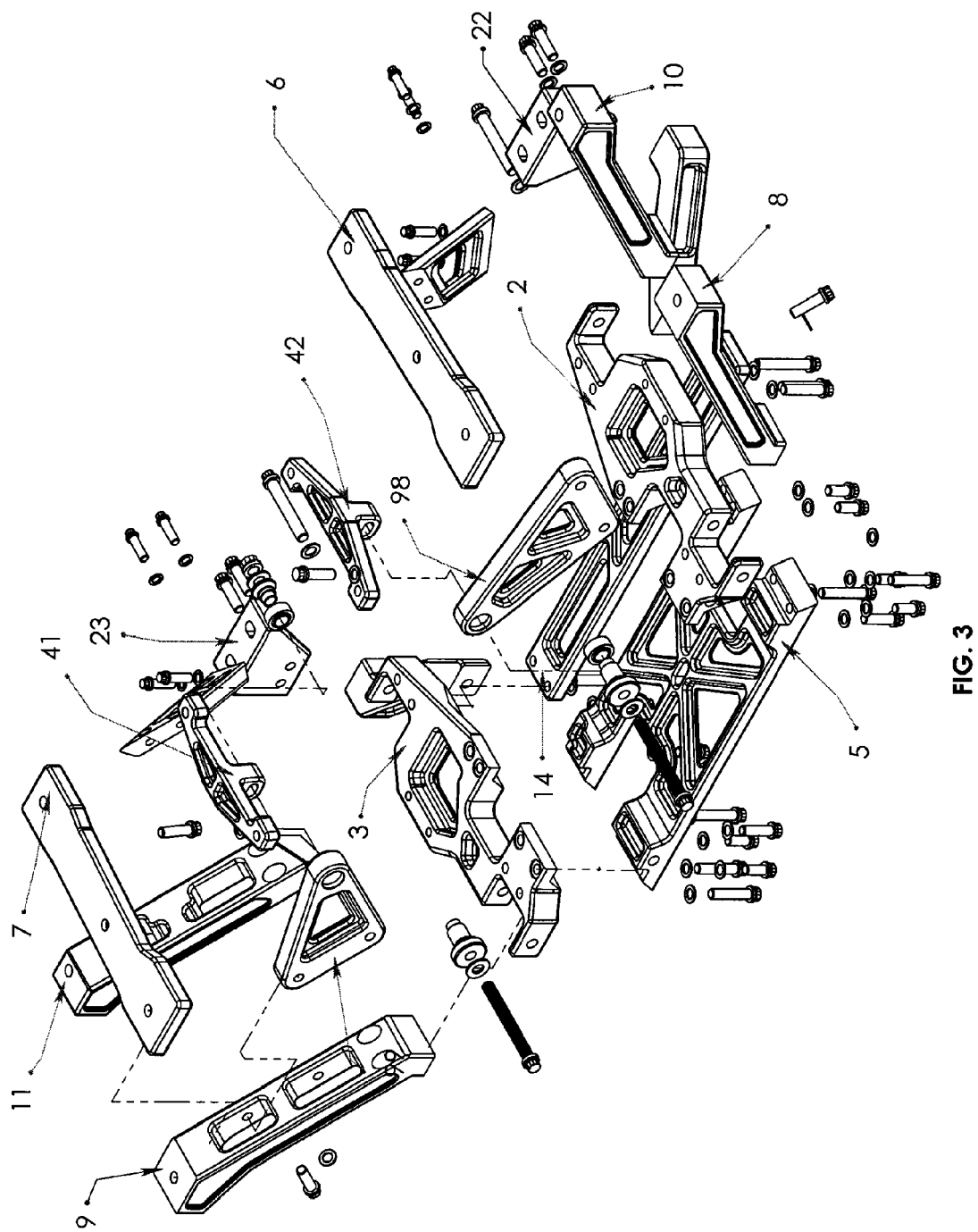
FIG. 3 is an exploded view of part of a modular suspension system shown in FIG. 1 to demonstrate how the various modular parts fit together.

FIG. 3 is an exploded view of part of a modular suspension system shown in FIG. 1 to demonstrate how these parts fit together. In FIG. 3 the following parts of the system 100 can be seen: the left frame mount locator 7, the right frame mount locator 6, left upper motor mount 41, right upper motor mount 42, the left lower motor mount 99, the right lower motor mount 98, the left cradle upright front 9, the left cradle upright rear 11, the left side cradle mount 3, the right side cradle mount 2, the front cross member 5, the rear cross member 14, the left cradle support cup 23, and the right cradle support cup 22. The frame mount locator 7 sits on top of and is connected to the top end of the cradle upright front 9 and cradle upright rear 11. At their bottom ends the left side cradle upright front 9 and cradle upright rear 11 are connected with to the cradle mount 3. The cradle mount 3 is in turn connected to the front cross member 5 and the rear cross member 14 at each of its ends.

In a preferred embodiment the connection of the pieces of this system 100 are done via bolts, however it should be noted that in other embodiments the connection can be done via pins, welding, hydroforming, casting, forging or stamping. The one or more cross members 5 and 14 are removable from their connection to the right 130 and left side 120 of the suspension. The ability to remove these cross members 5 and 14 allows the car's engine or other parts to be reached. This enables the user of this system 100 to easily change the oil pan, for access to the oil pump or other internal engine components fix the car's engine.

Figure 4:
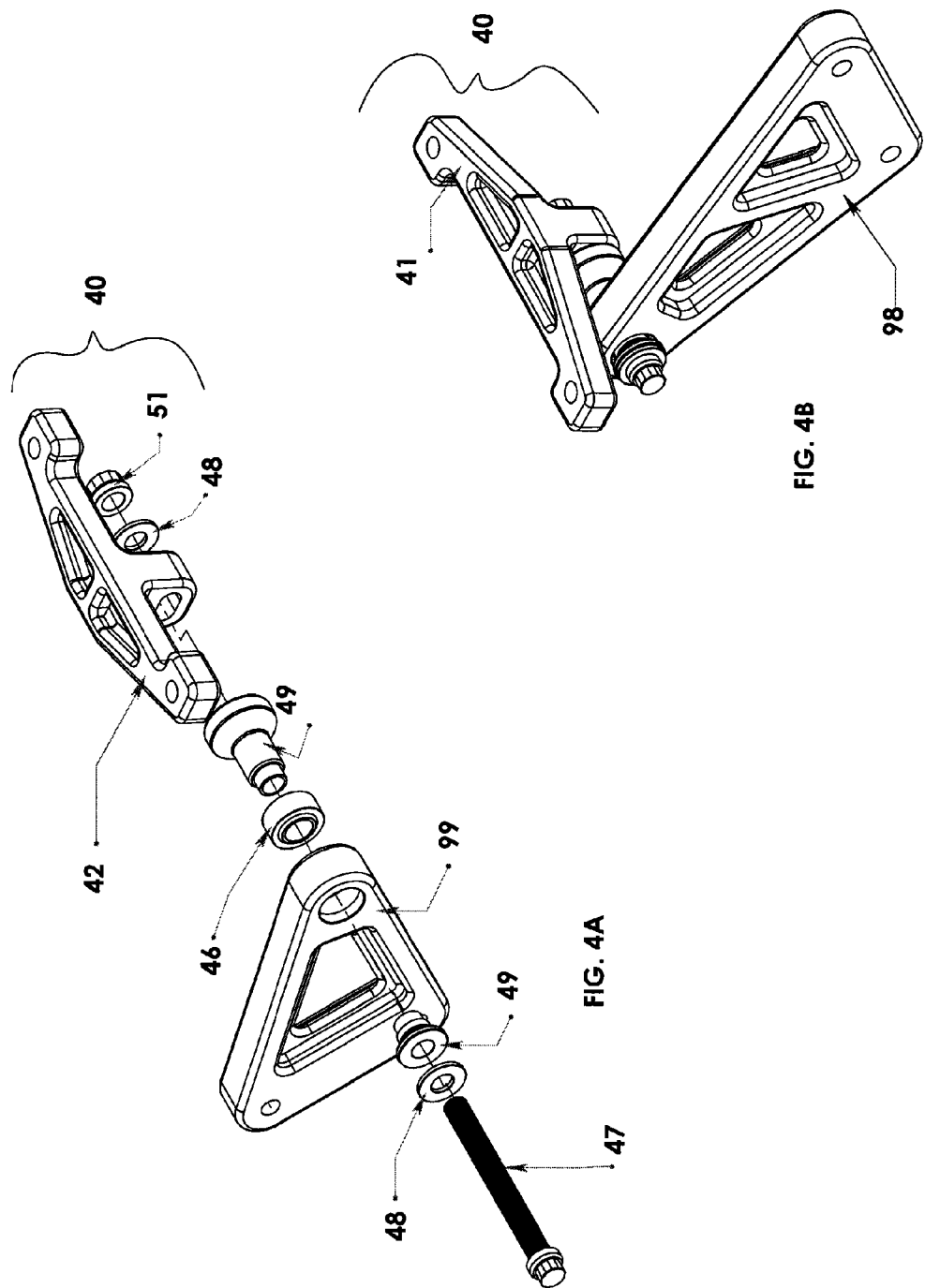
FIG. 4A is an exploded view of a modular motor mount of the modular suspension system shown in FIG. 1 showing the use of a spherical bearing.
FIG. 4B is an assembled modular motor mount of the modular suspension system shown in FIG. 1 showing the use of a spherical bearing.

FIGS. 4 A and B are views of the left and right motor mounts of the system 100. The assembly of the upper motor mount to the motor mount frame comprises the motor mount. The left 41 and right 42 upper motor mount have an upper and lower component, the lower component is called the motor mount frame 99 and 98 which connect to the upper motor mounts 41 and 42. The motor mount frames 99 and 98 on the left and right connect with the cradle uprights front 8 and 9. The upper motor mounts 41 and 42 are secured to the car's motor. FIG. 4A shows the motor mount 40 on the left side in an exploded view. The motor mount is comprised of motor mount frame 99 and 98, and upper motor mount 41 and 42, connected together with a spherical bearing 46 or alternately a ball joint.

The spherical bearing 46 is a cylindrical piece of metal with injection molding and with an open round unit in its center. The spherical bearing 46 can move in all directions and never needs to be lubricated. Looking at FIG. 4A the motor mount frame 99 and upper motor mount 42 sections can be seen separated from one another. In one embodiment these two pieces can be connected by passing a screw 47 through a washer 48, through a high misalignment bushing 49, through the motor mount frame 99, through the spherical bearing 46, through a second high misalignment bushing 49, through the upper motor mount 42, through a second washer 48 and screwing into a nut 51. The high misalignment bushings 49 used throughout this system come in different sizes. High misalignment bushings 49 are used for allowing the spherical bearings to articulate beyond the normal range of motion. They increase the range of motion from approximately 9 degrees to approximately 12 degrees. In alternative embodiments different types of bushings could be used and a greater range of motion could be achieved.

The spherical bearing 46 allows the connection between the system 100 and the engine/transmission assembly which is connected to the upper motor mounts 41 and 42 to be articulated in the proper driveline angle and allows the motor to be articulated for transmission removal and installation from the vehicle without binding. FIG. 4B shows the right motor mount which has been assembled.

Figure 5:
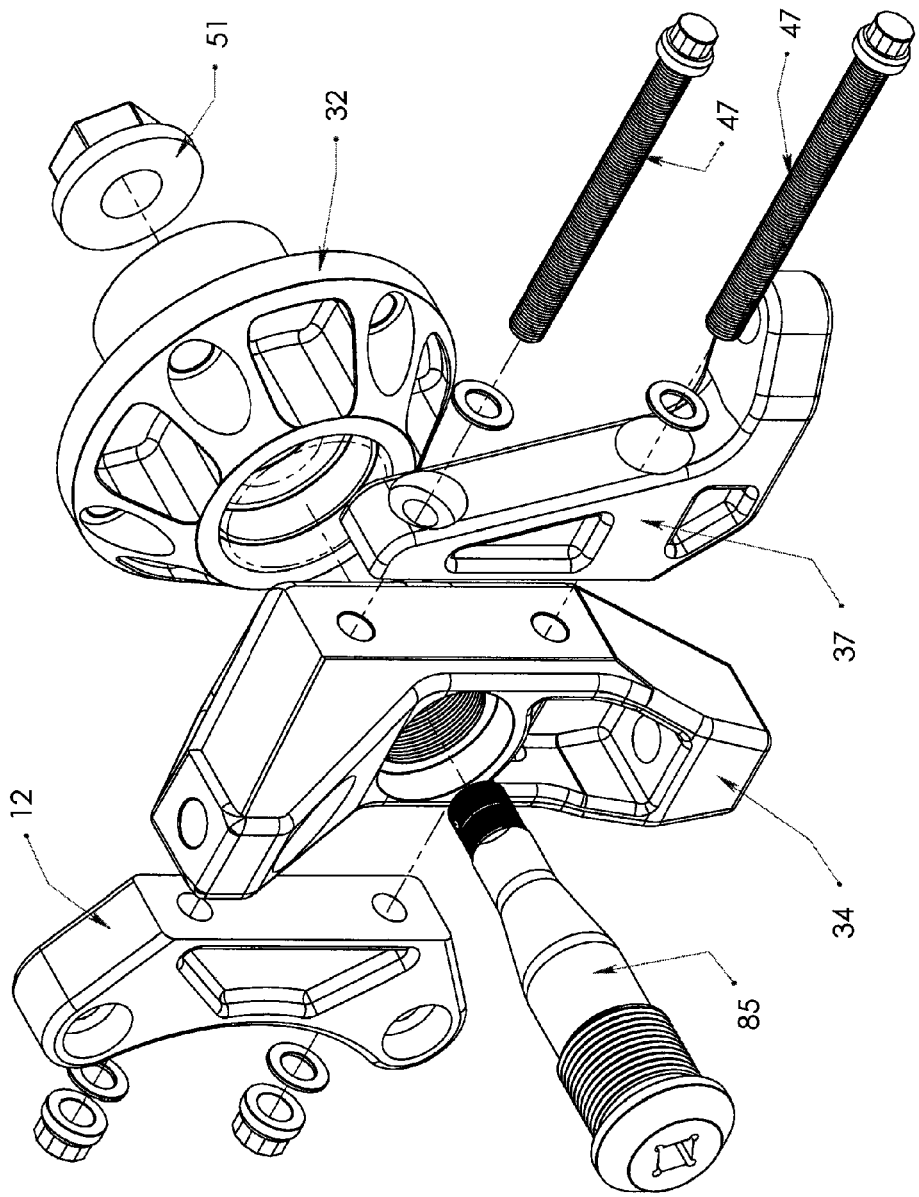
FIG. 5 is an exploded view of a modular spindle of the modular suspension system shown in FIG. 1 showing its interconnection and attachment to the hub.
Figure 12:
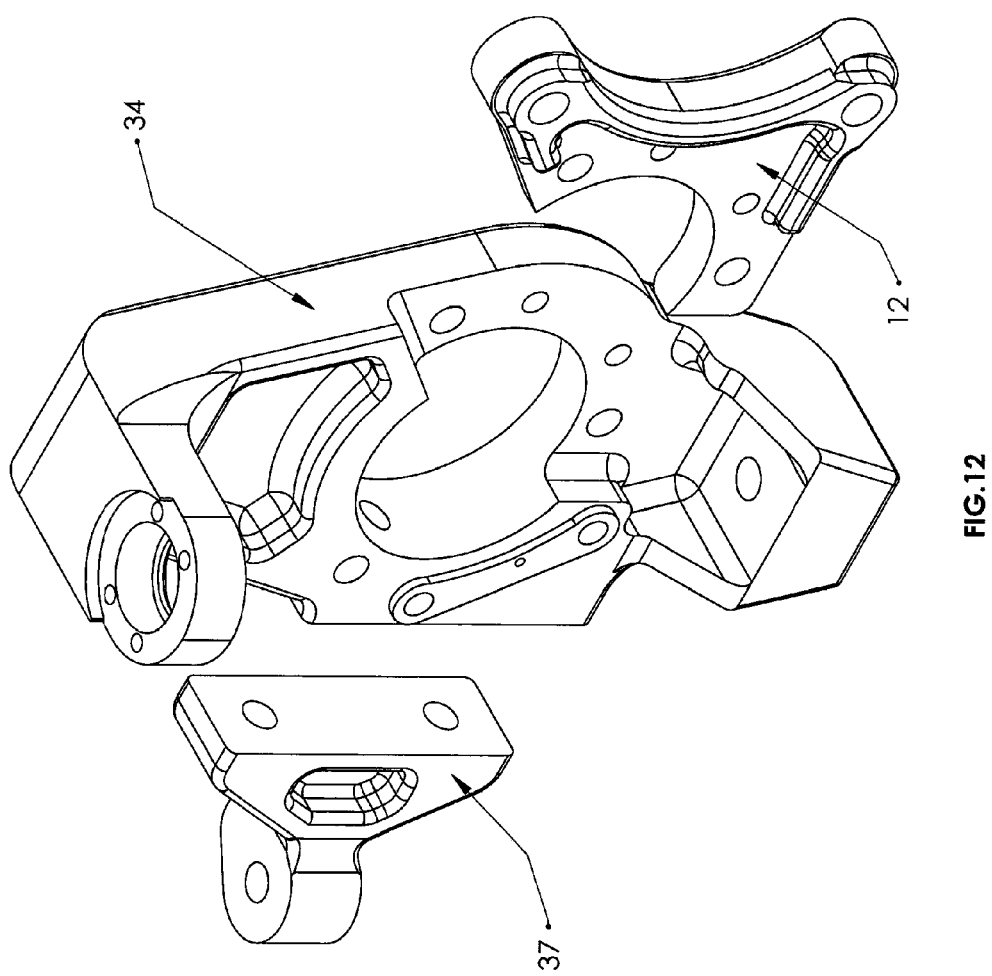
FIG. 12 is an alternate embodiment of the modular spindle showing the configuration of the various parts of the spindle and how they connect

Referring to FIGS. 5 and 12 two embodiments of a modular spindle are shown and displayed. FIG. 5 is an exploded view of one embodiment of the modular system showing the spindle and the parts it is connected to. FIG. 12 is an alternate embodiment of the modular spindle showing the configuration of the various parts of the spindle and how they connect. In the prior art suspensions spindles are not modular and are all one piece. In the instant system 100 the spindle is modular and is comprised of the following parts the upright 34, brake mount 12 (also referred to in the industry as a brake caliper mount), steering arm 37 connected via bolts 47. The upright 34 attaches to the brake mount 12 and steering arm 37. The upright 34 has a hole running through its center so that the axle shaft 85 of the system can run through it. The axle shaft 85 runs through the upright 34, through the automobile hub 32 and is tightened with a nut 51.

The spindle is modular, and in one embodiment both the left and the right side spindles are symmetrical while in another embodiment they are asymmetrical. The height of the upright 34 can be changed to alter the roll center height of the vehicle (shim height to be able to fine tune the suspension geometry for high performance). In the embodiment of the spindle shown in FIG. 12 the hole running through the upright 34 is raised one inch from the bottom of the upright. Raising the hole keeps the geometry of the system 100 in line and allows the center of gravity of the automobile to be lowered. The configuration of the steering arm 37 and brake mount 12 can be changed to fit different models of automobiles.

The symmetry and the modular design of the parts of the spindle including the upright 34, brake mount 12 and steering arm 37 shown in FIG. 5 allows for the size and shape of the brake mount 12 and steering arms 13, 37 to be changed for many different driving applications or vehicle models. The assembly of the brake mount 12, spindle 34 and steering arm 13, 37 can be used independently in several other original suspension systems. The spindles 34 of this system 100 are designed with a relocated axle shaft 85 which lowers the ride height of the vehicle while maintaining the optimized geometry of the suspension system 100. This lowering of the ride height allows for a lower center of gravity of the vehicle without compromising the performance of the system 100. The axle shaft 85 which is fed through the spindle 34 has left hand threads so that when the hub nut 51 is tightened, it also tightens the axle shaft 85. The axle shaft 85 inserted into the spindle 34 being of modular design allows for the spindle 34 to be used with axle/hub configurations of other vehicles.

Figure 6:
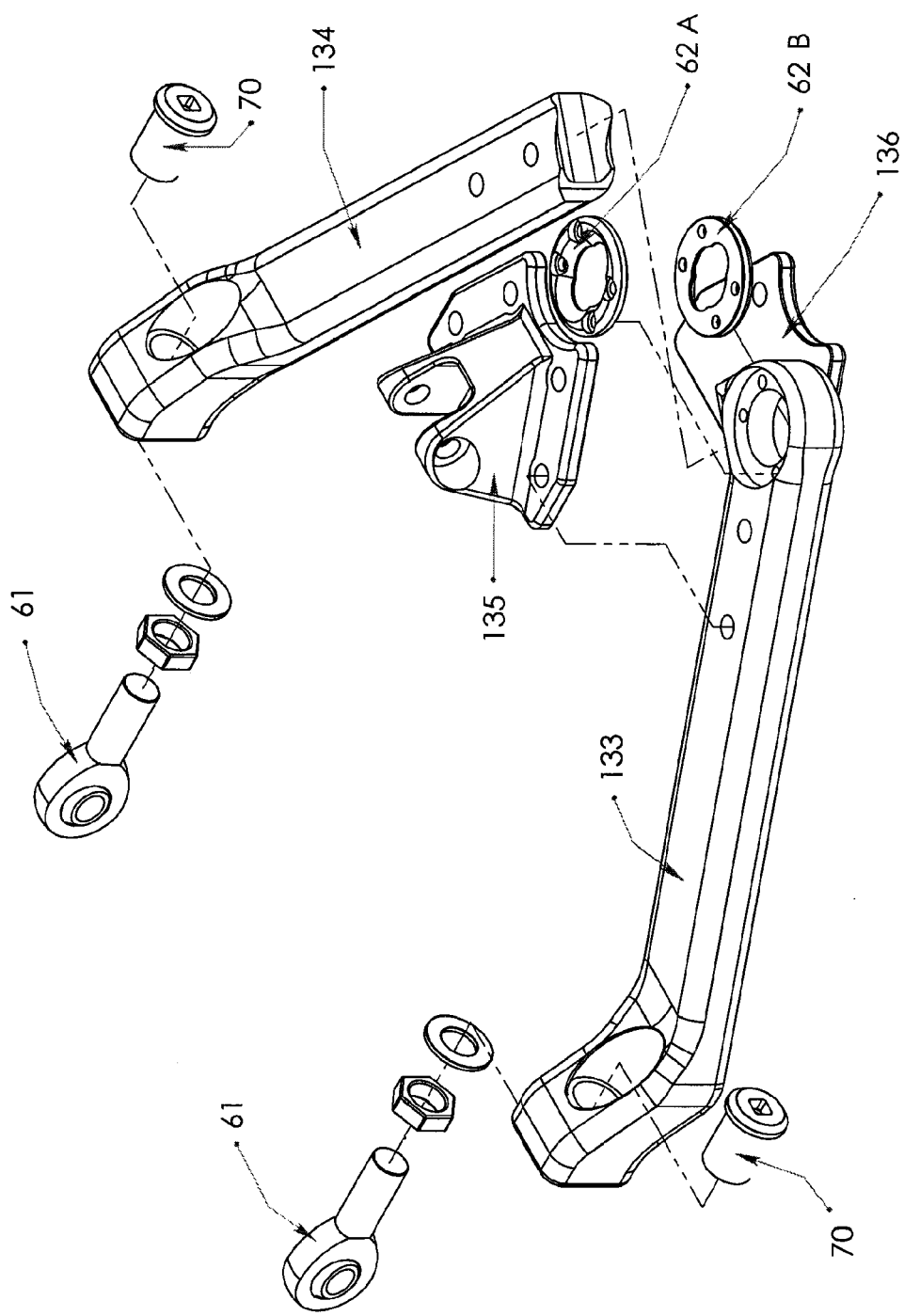
FIG. 6 is an exploded view of one embodiment of the lower control arms of the modular suspension system shown in FIG. 1.

FIG. 6 is an exploded view of the lower control arms 133 and 134 of the system 100. The lower control arms are modular in that they are comprised of a lower arm front half 133, a lower arm rear half 134, which are connected together. The lower control arms 133 and 134 each have rear pieces which are machined on through which the specially designed adjusters 70 fit. In one embodiment the lower arms are connected together by placing a upper bearing 62(*a*) retainer in the top front grove of the front half 133 and a lower bearing retainer 62(*b*) in the bottom front grove of the front half 133. The front half arm 133 is then lined up with the rear half arm 134 the lower shock mount 135 is placed on top. Bolts are then used to connect the front half and the rear half. Bolts run from the lower shock mount 135 through the arms and into the lower plate 136. The modular design of the lower controls arms 133 and 134 enables them to be used on either side of the car while reducing the cost of materials. A rod end 61 run through the distal end of each the front 133 and rear 134 lower arms. The rod ends are then secured in place by a specially designed adjusters 70 which will be explained in more detail below. The distal end of the rod ends 61 contain a spherical bearing which connects the arms to the cradle mounts 2 and 3 of the system 100. The lower control arms being of modular design allows them to be used independently of the system 100 in configurations of other vehicles.

FIG. 7 displays the anti-roll/swaybar 30 and lower control arms 133 and 134 of the modular system 100. The anti-roll swaybar 30 is connected to the lower control arms 133, 134 via a sway bar arm 31, a rod end 61 with spherical bearings 46 on either end, and a mount 74. This connection mechanism allows for smooth articulating motion without binding. The anti-roll/sway bar has three adjustment positions which can be seen by the three holes where 46 is attached to 31. These positions allow both an adjustability to increase or decrease the amount of chassis roll as needed for varying track and street conditions. Furthermore, the mount 74 to the lower control arm is capable of moving in and out on the arm which allows for further adjustability. The further in the softer and the further out the stiffer they are.

Figure 8A:
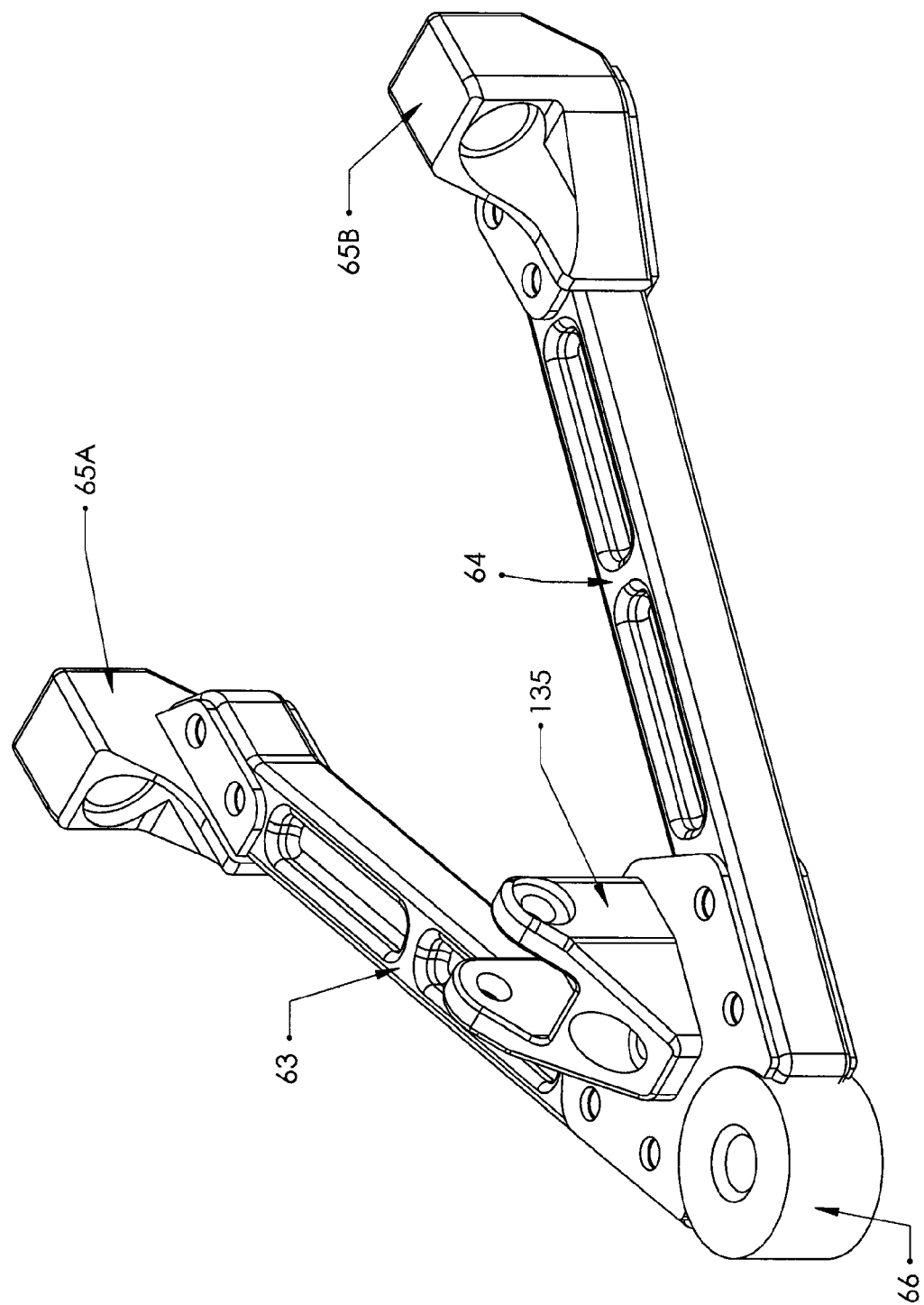
FIG. 8A is an alternate embodiment of the lower control arms of the modular suspension system where the lower arms are modular allowing their length to be changed.
Figure 8B:
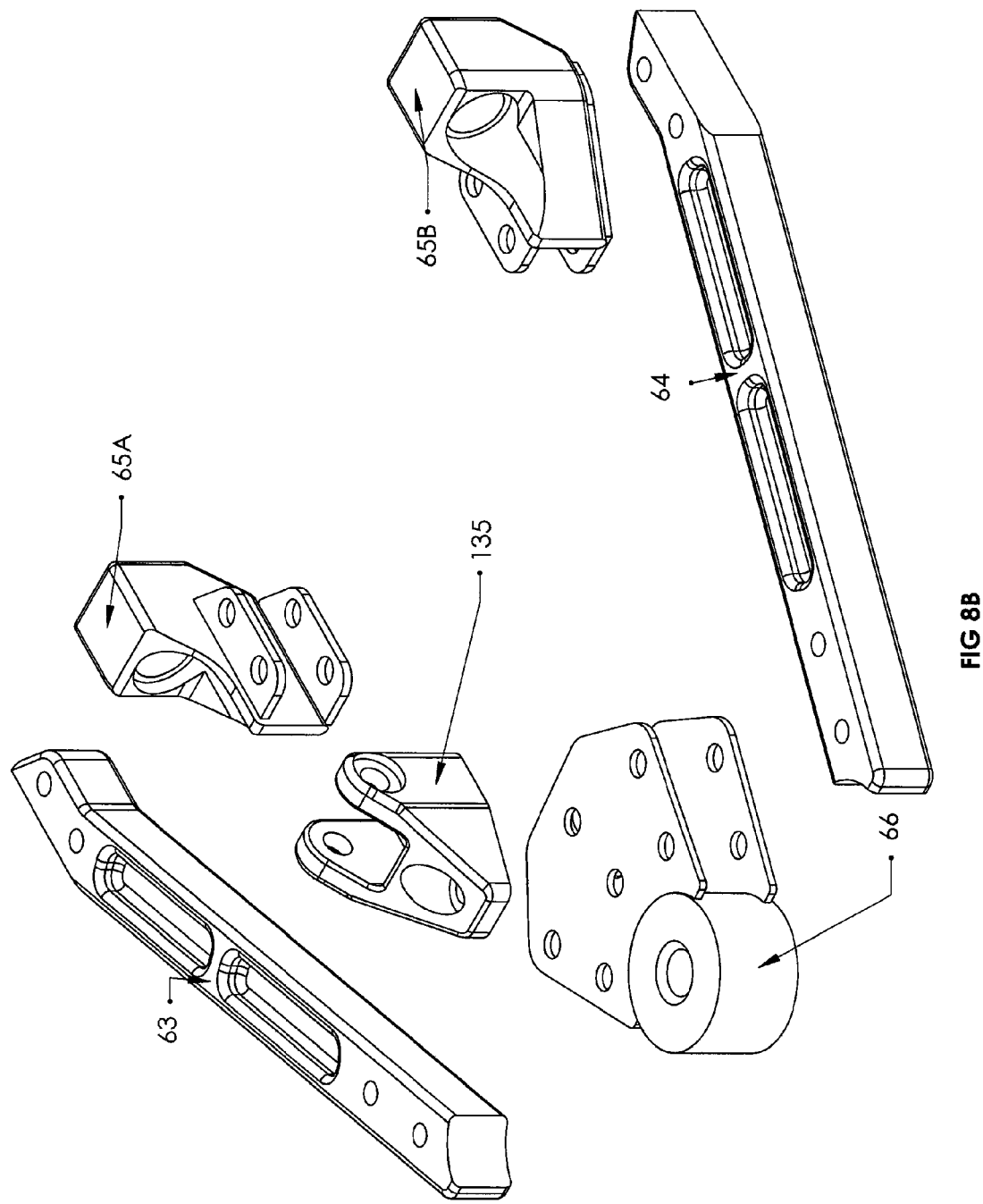
FIG. 8B is an exploded view of the lower arms of FIG. 8A.

FIG. 8A is a second embodiment of the lower control arms of the suspension system 100. This embodiment of the modular lower control arms allow for the length of the front 63 and rear 64 half of the arms to be changed depending on the model of car or the driving application of the vehicle. In this embodiment, the modular lower control arms are comprised of at a minimum a front half 63, a rear half 64, a spherical bearing mount lower 66 and two lower adjuster mounts 65A and B. The lower shock mount 135 is mounted on top of the arms. In this embodiment, the lower shock mount 135 is a slightly different shape. The front half 63 and the rear half 64 pieces of this embodiment can be interchanged. These pieces can be manufactured from either aluminum or steel. Manufacturing these pieces from aluminum reduces the weight of the overall system 100. The ability to interchange the front half 63 and rear half 64 reduces the cost of manufacture. A ball joint or spherical bearing sits in the center of the spherical bearing mount lower 66. This mount allows for the use of either a ball joint or spherical bearing. In the center it has either a spherical bearing or a ball joint just like the lower arms allowing for flexibility in the connection between the arms and the spindle assembly. The lower control arms being of modular design allows them to be used independently of the system 100 in configurations of other vehicles.

Figure 9A:
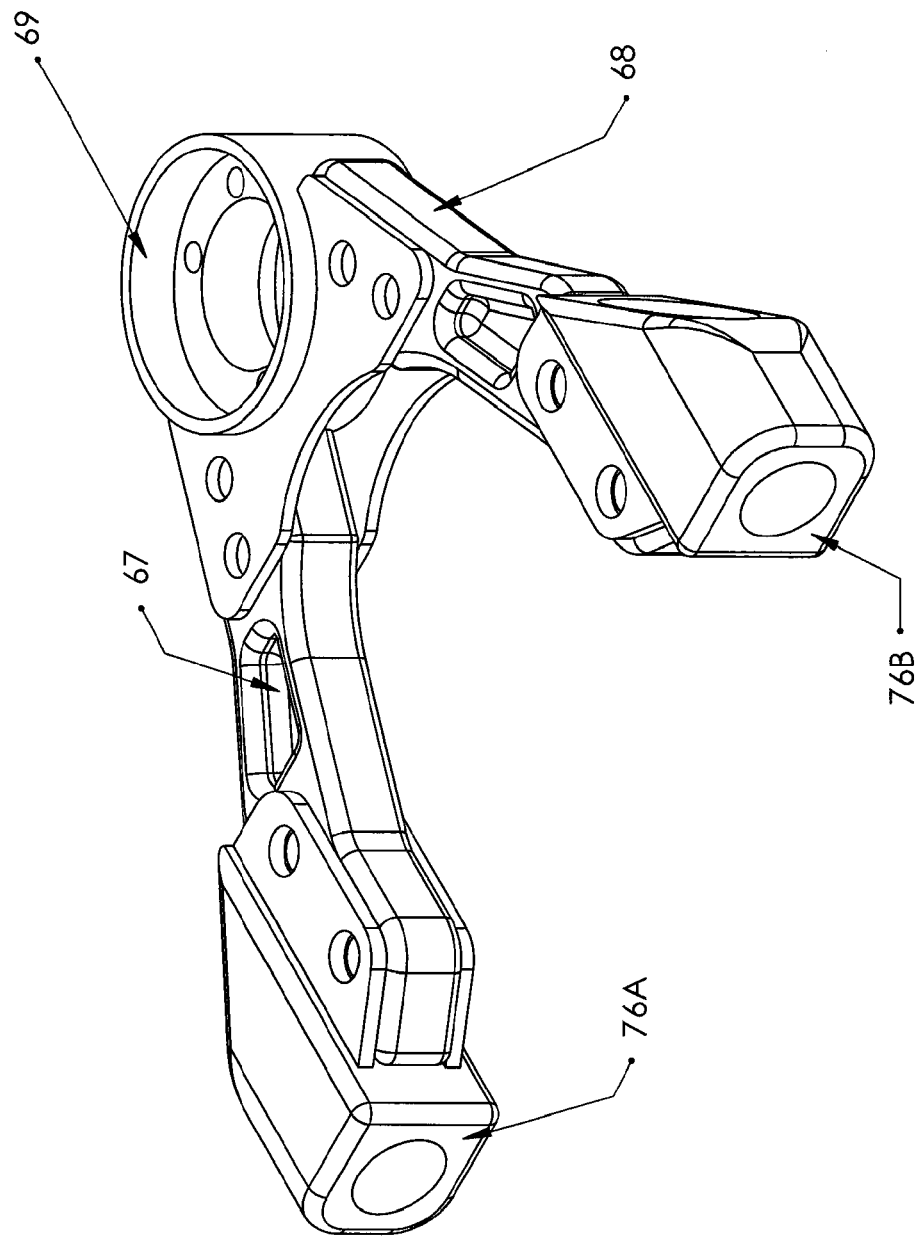
FIG. 9A is an embodiment of the upper control arms of the suspension system of FIG. 1 which are modular in design.

FIG. 9A is an embodiment of the upper control arms wherein the upper control arms of the system 100 are modular in design. The modular upper control arms of this system are comprised of a front half 67 and rear half 68, a spherical bearing mount upper 69 and two upper adjuster mounts 76A and B. FIG. 9B is an exploded view of the upper control arms of this embodiment. In this embodiment, the length of the front half 67 and rear half 68 of the control arm can be changed and either lengthened or shortened depending on the model of vehicle or driving application. These parts can be manufactured from either aluminum to reduce the weight or steel depending on the application. The ability to interchange the front and the rear half of these arms and the ability to manufacture them in various substances reduces the cost of manufacture for these parts. The upper adjuster mounts 76*a* and *b* attach to the upper control arm front half 67 and rear half 68 and house the adjusters 70. The spherical bearing mount upper 69 connects the rear half 67 and front half 68 half of the arms. In the center it has either a spherical bearing or a ball joint just like the lower arms allowing for flexibility in the connection between the arms and the spindle assembly. The upper control arms being of modular design allows them to be used independently of the system 100 in configurations of other vehicles.

Figure 10A:
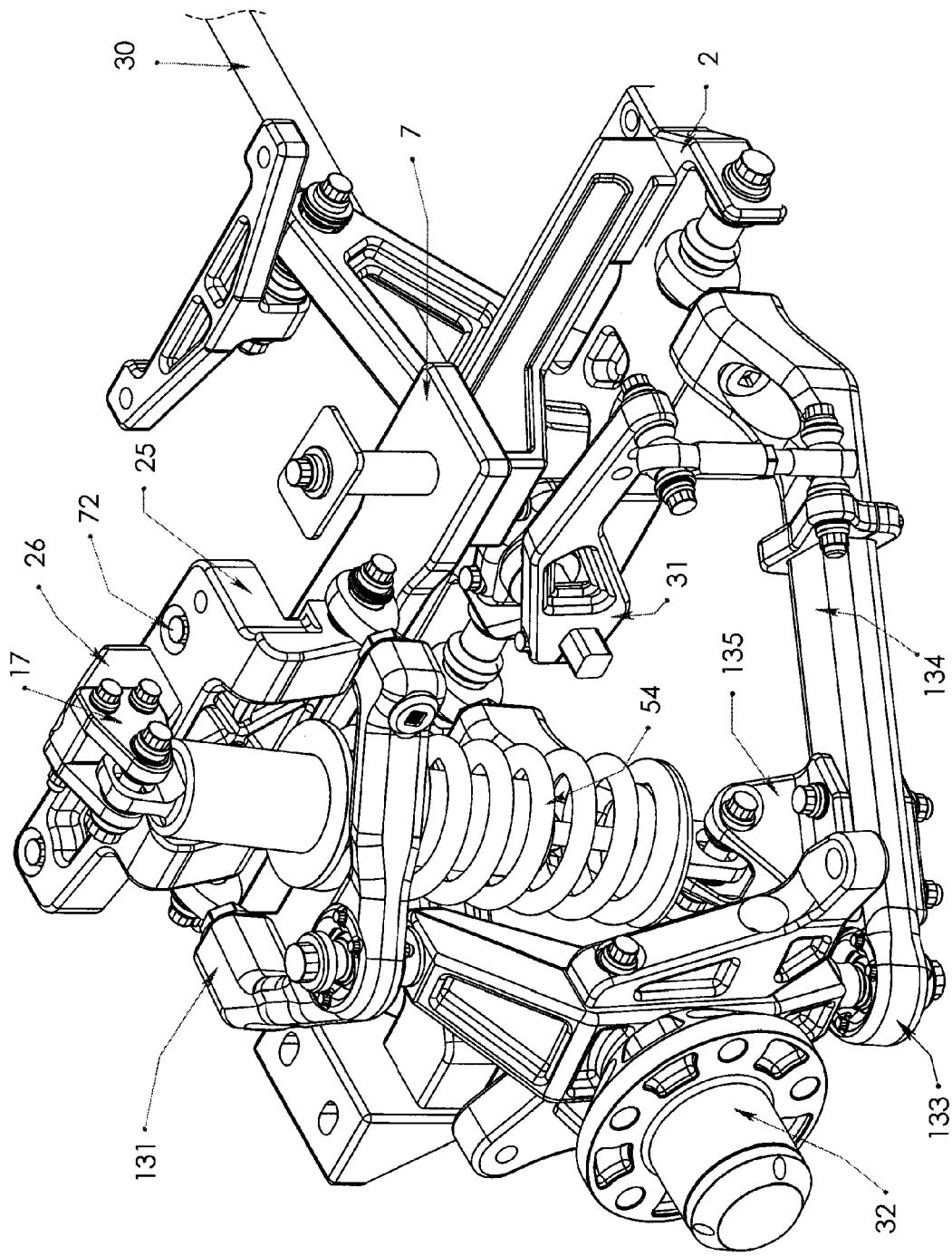
FIG. 10A is an embodiment of a shock set-up of the modular suspension system commonly referred to as a conventional coilover shock.

FIG. 10A is an embodiment of a traditional shock configuration of the system 100. This embodiment of a shock set-up is commonly referred to as a conventional coil over shock. In this figure the shock 54 can be seen mounted at its lower end to the lower shock mount 135 which is connected to the upper side of the lower control arms 133 and 134. The upper end of the shock 54 is connected to the upper shock mount 17. The upper shock mount 17 is also modular in design and is comprised of the upper shock mount base 17 and two upper shock mount end plates 26. The modular aspect of the upper shock mount 17 and 26 allows for the use of different sized shocks. The modular design of the upper shock mount 17 and 26 also allows for ride and height adjustments. With this design, the system 100 is enabled to become a rocker/cantilever/ bellcrank set-up so that the shocks can be mounted on the inside of the engine compartment for ease of adjustment and to reduce unsprung weight.

Referring to FIG. 10A the upper shock mount 17 and 26 is connected to the top of the upper arm mount 25. The bottom end of the upper arm mount 25 is connected to the upper arms 131. The frame of the automobile runs between the upper arm mount 25 and the frame mount locator 7. Bolts connect the upper arm mount 25, automobile frame, and frame mount locator 7. Anti-crush tubes 72 are inserted through these three parts before the bolts are inserted so that the tubing of the frame rail does not collapse. The anti-crush tubes act as an internal positive stop once the rail has reached its clamping force. In looking at this figure the sway bar 30 can be seen running from the left side toward where the right side of the engine would be. The sway bar 30 stabilizes the system 100. The sway bar works as tortional resistance between the right and the left side of the system 100.

Figure 10B:
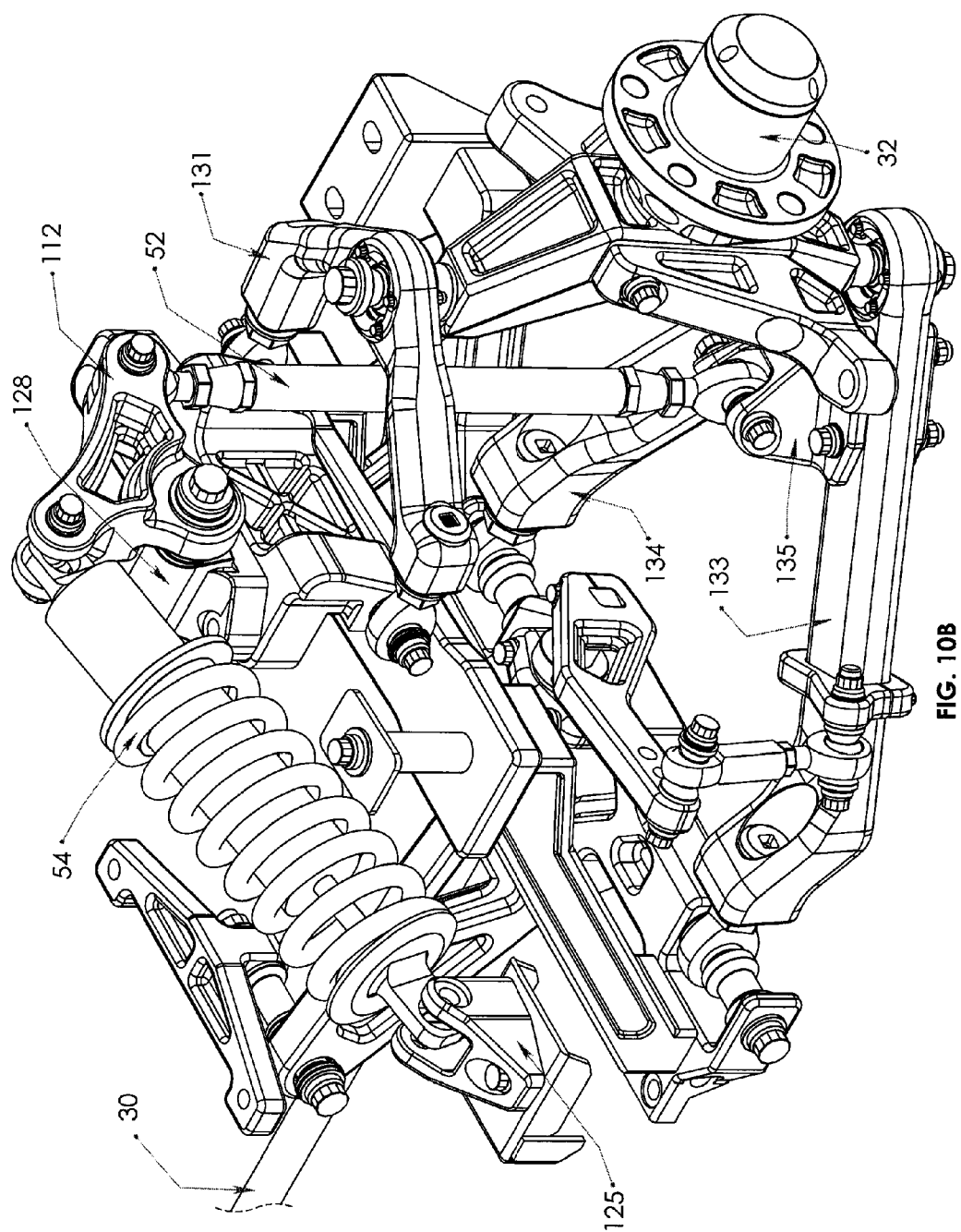
FIG. 10B is an embodiment of a shock set-up of the modular suspension system commonly referred to as a rocker set-up.

In referring to FIG. 10B, an embodiment of the shock set-up commonly referred to as a rocker set-up is shown and displayed. The rocker set-up assembly is comprised of the following parts lay down shock mount 125, shock 54, rocker 112, rocker mount 128, push rod 52, and lower shock mount 135. The rocker 112 has three corners one is connected to the shock 54 one is connected to the rocker mount 128 and the other is connected to the push rod 52. This rocker set-up assembly can be used apart from the system 100 as a whole and can be installed in prior art suspensions to improve their performance. In this embodiment of the rocker set-up of the instant system 100 it can be seen that one end of the shock 54 is attached to one corner of the rocker 128 and the other end of the shock 54 is attached to the lay down shock mount 125. The upper end of the push rod 52 is connected to the second corner of the rocker 112 and the lower end of the push rod 52 is connected to the lower shock mount 135.

The upper shock mount or the rocker mount 128 in other embodiments is modular in design which allows for the use of different types of shocks and different size shocks 54. The shocks 54 can range from 10 to 20 inches in length. The ability to change up the shocks 54 also allows for a ride height adjustment in the vehicle. With this design it also allows for the system 100 to become a rocker/cantilever/bell crank so the shocks can be mounted inside the engine compartment for ease of adjustment and to reduce unsprung weight.

FIG. 10C displays an alternate embodiment of the shock set-up of the suspension system often referred to as rocker set-up where the rock mount sits on top of the shock or strut tower already present in the vehicle and the shock sits on the outside of the shock or strut tower. The rocker mount 128 and the rocker 112 of this embodiment are manufactured in a slightly different shape then in the previous embodiments to enable them to extend the connection with the shock beyond the shock or strut tower allowing the shock to sit outside the shock or strut tower. In this embodiment the rocker mount 128 is bolted to the shock or strut tower. In various models of vehicles, the configuration of the bolts and the exact size of the rocker mount can vary slightly in order to accommodate the different types of shock or strut towers. The rocker 112 of this embodiment is longer and narrower to enable it to extend over the shock or strut tower and connect with the shock 54 on the outside of the shock or strut tower. The laydown shock mount 125 is bolted to the vehicle frame 78 just outside of the shock tower. The shock 54 of this embodiment has an upright angle. The push rod 52 connects to the rocker mount through existing hole on the top of the shock or strut tower.

FIG. 11A-D shows the specially designed adjusters 70 of the system 100. These specially designed adjusters 70 are used with the control arms. There are specially designed adjusters 70 which connect the lower front control arm 133 and the lower rear control arm 134 to the cradle mount 2. There are also specially designed adjusters 70 which connect each side of the upper control arms 131 to the upper arm mount 25. In different embodiments of the system the specially designed adjusters can be used to connect other parts of the suspension system 100. Referring to FIG. 11A the specially designed adjusters 70 are machined with a three-eighth inch square drive for the upper control arms 133, 134 and a three eighth inch square drive for the lower arm 131 so that the common three-eighths inch ratchet wrench extensions can be used which makes the camber and caster alignment adjustments for the vehicle easier. Referring to FIG. 11C threads can be seen on the interior of the specially designed adjuster 70, allowing them to be screwed onto rod ends 61 to connect parts of the system 100.

FIG. 12 is an alternate embodiment of the modular spindle showing the configuration of the various parts of the spindle and how they connect. In the prior art suspensions spindles are not modular and are all one piece. This spindle can be used independently from the system 100 as a whole. It may be incorporated into other existing suspension systems.

The system can be fitted with many optional components in various embodiments. Some of the optional components of the system can be fitted with would include the axle 85 in the spindles 34 being changed to accommodate different style hubs 32 for different applications; the control arms 133 and 134 can be made in various lengths to fit different vehicle widths and applications; motor mounts can be changed to accommodate different engine types and sizes, and the system could be modified to function without a shock tower.

The above description of disclosed embodiments is provided to enable any person skilled in the art to make or use the invention. Various modifications to the embodiments will be readily apparent to those skilled in the art; the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A suspension system for wheeled vehicles, the suspension system structurally comprised of:
    a right and a left side, which are each composed of the same parts assembled in the same configuration, connected by one or more removable cross members and a sway bar; and
    multiple modular parts on each the right and left side which can be modified as to configuration, size and shape to allow the system to be used for different driving applications on in different vehicle models,
    wherein one of the modular parts on each the right and left side are the spindles comprised of a brake mount, upright, and steering arm and wherein the modular parts are interconnectible such that the modular parts may be easily disassembled into individual components.

2. The suspension system of claim 1, wherein one of the modular parts on each the right and left side are the lower control arms.

3. The lower control arms of claim 2, wherein each arm is comprised of at least a lower arm front half, a lower arm rear half, which are connected together with a specially designed adjuster.

4. The suspension system of claim 1, wherein one of the modular parts are the upper control arms.

5. The modular upper control arms of claim 4 which are composed of at least the following parts a front half, a rear half, a spherical bearing mount lower and two lower adjuster mounts.

6. The suspension system of claim 1, wherein one of the modular parts is the upper shock mount which can be manufactured in different dimensions to allow various upper shock mount attachments points enabling ride heights adjustments.

7. A suspension system of claim 1, wherein the uprights of the spindles are designed with relocated axle shafts to lower the ride height and maintain optimum geometry of the system.

8. The suspension system of claim 1, wherein the axle shaft has left hand treads and a hub nut screwed onto its end, enabling the user to tighten the hub nut and the axle shaft simultaneously.

9. The suspension system of claim 1, wherein the swaybar has three adjustments in its connection with the right and left side of the system.

10. A suspension system for wheeled vehicles which is configured to be modular in design and at a minimum comprised of the following parts:
   one or more removable cross members;
   a sway bar;
   two modular spindles each composed of a steering arm, an upright, and a brake mount connected by bolts;
   two cradle braces;
   a modular motor mount composed of an upper mount and a frame connected together with a bolt running through a spherical bearing and one or more rack bushings;
   an axle shaft running through the spindle;
   two or more shock mounts;
   two or more shocks;
   two or more cradle uprights;
   two or more modular upper arms; and
   two or more modular lower arms.

11. The suspension system of claim 10, wherein the modular lower control arms are composed of the following parts, a front half, a rear half each with a proximal and distal end, connected to each other at their distal end, connected by way of a specially designed adjuster and rod end to the cross members at their proximal end, and connected to the lower shock mount at their distal end.

12. The suspension system of claim 10, wherein the modular lower control arms are composed of at a minimum the following parts, a front half, a rear half, a spherical bearing mount or ball joint mount, and two or more lower adjuster mounts.

13. The suspension system of claim 10, wherein the upper control arms are symmetrical and can be used on either the right or left side of the suspension and can be inverted.

14. The suspension system of claim 10, wherein the upper control arms are shifted behind the center line of the lower arms allowing caster to be built into the geometry of the system.

15. An automobile suspension system comprised of:
   a plurality of modular parts including two modular spindles, each spindle including;
   a brake mount,
   a steering arm, and
   a upright, with a hole running through its center, configured to be attached to the brake mount and the steering arm,
   wherein the modular parts are interconnectible such that the modular parts may be easily disassembled into individual components.

16. The spindle of claim 15, which includes a relocated axle shaft allowing a two inch drop in ride height of the automobile to maintain proper suspension geometry.

17. The spindle of claim 15, wherein the brake mount or steering arms can be changed to accommodate many different vehicle applications.

18. The spindle of claim 15 which includes an axle shaft running through the hole in the center of the upright and sliding into an automobile hub being tightened by a hub nut.

\* \* \* \* \*